United States Patent [19]

Simonetti

[11] Patent Number: 5,295,261
[45] Date of Patent: Mar. 15, 1994

[54] HYBRID DATABASE STRUCTURE LINKING NAVIGATIONAL FIELDS HAVING A HIERARCHIAL DATABASE STRUCTURE TO INFORMATIONAL FIELDS HAVING A RELATIONAL DATABASE STRUCTURE

[75] Inventor: Charles T. Simonetti, Citrus Heights, Calif.

[73] Assignee: Pacific Bell Corporation, San Francisco, Calif.

[21] Appl. No.: 558,618

[22] Filed: Jul. 27, 1990

[51] Int. Cl.$^5$ .................... G06F 15/40; G06F 15/419
[52] U.S. Cl. ............................ 395/600; 364/419.19; 364/963.3; 364/966.2; 364/974; 364/974.3; 364/974.4; 364/DIG. 2; 364/282.1; 364/283.2; 364/283.4
[58] Field of Search ................ 395/600, 800; 364/419

[56] References Cited

U.S. PATENT DOCUMENTS 4,606,002  8/1986  Waisman et al. ................... 395/600
5,201,046  4/1993  Goldberg et al. ................... 395/600

OTHER PUBLICATIONS

"An Introduction to Database Systems", C. J. Date, vol. 1, pp. 63-67, 541-546, 1986, Addison-Wesley, Reading, Mass.

Primary Examiner—Thomas C. Lee
Assistant Examiner—Paul Harrity
Attorney, Agent, or Firm—Townsend and Townsend Khourie and Crew

[57] ABSTRACT

Improved database structure is described in which the fields of each database record are divided into two classes, navigational and informational data. The data in the navigational fields is stored in a topological map which may be viewed as a tree structure or the merger of two or more such tree structures. The informational data is preferably stored in a conventional relational database. Each leaf node in the topological map specifies a unique record in the relational database.

4 Claims, 6 Drawing Sheets

| 211 | STATE |
|---|---|
| 212 | CALIFORNIA, NEVADA |
| 213 | NONE |

| 221 | CITY |
|---|---|
| 222 | SAN FRANCISCO, RENO, LOS ANGELES, LAS VEGAS |
| 223 | STATE |
| 224 | 1, 2, 1, 2 |
| 225 | DISTRIBUTION CENTER |
| 226 | 1, 1, 2, 2 |

| 231 | DISTRIBUTION CENTER |
|---|---|
| 232 | NORTHERN, SOUTHERN |
| 233 | NONE |

(203)

HYBRID DATABASE STRUCTURE LINKING NAVIGATIONAL FIELDS HAVING A HIERARCHIAL DATABASE STRUCTURE TO INFORMATIONAL FIELDS HAVING A RELATIONAL DATABASE STRUCTURE

FIELD OF THE INVENTION

The present invention relates to the storing and retrieving information, and more particularly database systems.

BACKGROUND OF THE INVENTION

A database generally comprises a plurality of records for storing information on some topic. For example, a database may have records for each city in the United States. Each record of a database generally comprises a predetermined number of fields. In general, each record has the same distribution of fields as other records. Each field contains information on a particular aspect of the objects of the database. For example, the database of cities in the United States may have a field containing the population of each city. Additionally, the database may have a field for indicating the state which contains the city in question. Some fields in a database may have values that range in a continuum of values, e.g., the population of the city. Other fields in a database may have values which range in a set of predetermined values, e.g., the state in which the city is located.

One common form for representing the records in a database is the relational database format. The relational database comprises a table having rows and columns. Each row represent a particular record, and each column row represents a data field. All rows share the same columns and type of information. The above example database of cities may be formulated into a relational database. In such a database, each row might represent a city and the relational database would have a row for every city of interest. The relational database might include columns for storing the name of the city, the county in which it is located, the state in which the county is located, and the population of the city.

Data is added to the database by adding rows at the end of the database to represent added records. Information is extracted from the database in the form of queries. A query typically consists of a set of requirements which the data in one or more of the columns must satisfy for the record to be returned. A simple query takes the form of finding all rows in the relational table which have the same value in a given field, e.g., all records having the county field equal to a particular value. More complex queries to the database involve examining a plurality of columns, e.g., all rows in which the county has a particular value and the city has a particular value. For example, one might wish to view the population data for all cities in a particular county of a particular state.

If the number of records in the database is N, N examinations will have to be performed. While this is a relatively simple task for a small database, the examination of each record in the database for a large database constitutes a great expense of time. First, the search time for a simple query is related to N numbers of records in a database. Second, large databases often exceed the memory capacity of the computer and require the storage of records on some secondary medium such as disks and tapes. The access time for secondary medium are often orders of magnitude greater than access times in computer memory. The use of secondary storage in this manner leads a dramatic increase in time for simple queries.

One prior art method for reducing search times in such large databases is to optimize the order of the records in the database for one particular type of query. The optimization is accomplished by ordering the rows of the database according to the value of some variable calculated from the query. For example, suppose one often wishes to search the database for the data on a particular city by giving the name of the city. The rows would then be ordered based on the alphabetical order of the city names. A particular name could then be found by performing a binary search on the names in city column.

Consider a database having N records. Without ordering the records, the maximum time needed to search the database for a record having a particular value in a particular column is proportional to N. If the records are known to ordered, maximum number of records that need to be searched is reduced to approximately $Log_2 N$. If N were approximately one million, the ordering of the database would reduce the maximum number of records to be searched from approximately one million to 20.

Although the ordering of the database bestows significant advantages, there is a limit to the benefit obtained. First, the database must be ordered. The work to perform the initial ordering is roughly equal to $N Log_2 N$. In addition, each time new data is added to the database, the entire database must be reordered. Finally, the method only improves the search time for records having a specified value or range of values of the variable used to order the records.

In principle, one could maintain multiple copies of the database, each copy being ordered by different search variables. However, the additional storage space renders this approach unworkable.

A second prior art method addresses the limitation of one optimized search variable while avoiding the unacceptably large memory requirements of storing multiple copies of the database. In this method, a separate table is constructed for each search variable. This table will be referred to as a search table in the following discussion. Each search table includes a plurality of records, one such record corresponding to each record in the database. Each record has two fields. Hence, the search table has two columns. The first column is a pointer which specifies the physical location of the corresponding database record. The second column contains a value which is monotonically related to the search variable in question. The search table is then ordered by the search variable. That is, the records of the search table are rearranged such that the values in the second column appear in a monotonically increasing or decreasing order.

For example, consider the case in which three columns in the database consisted of the year, month, and day, respectively, of a date. To setup a search table for searching the database by specifying a range of dates, a search variable might be constructed by multiplying the year by 10000, adding the result to the month by 100 and then adding in the day of the month. This value would then be stored in the second field of the search record corresponding to each database record. After ordering the search the table, all records having a date between two values could be found by calculating the search variable value of the first date and performing a binary search on the second column of the search table. The search would return the first instance in which two records in the search table have second column values in which one of the values equals the search variable value, or the search variable value lies between the two variables. The records in question could then be identified by searching the records on each side of the pair of records in question.

In this second prior art method, a search table is constructed for each search variable on which searches are to be performed. Typically, the search tables require less memory space than the entire database and usually may be kept entirely in main memory. This allows for faster access with respect to the first prior art method. It should be noted that the computational effort to construct a search table is significantly greater than that needed to search the entire database once for a record satisfying some criterion based on the search variable in question. Hence, this approach represents a savings only when multiple searches are anticipated on the search variable in question.

This method has several other disadvantages. First, a large amount of redundant information is still maintained in the search table. The search table for each search variable comprises redundant information that must be maintained in addition to the database. Second, it requires storing and maintaining a search table for each possible search variable. All desirable search variables are seldom known at the time the database is being constructed. In addition, even if all search variables were known, the storage required by the corresponding search tables is often too large.

As a result, most systems utilizing search tables store a few search variable tables and utilize complex queries which reference more than one search variable. A complex query usually comprises a selection criterion based on a first variable AND a second variable. For example, assume that the geographic database discussed above included three columns for the month, day, and year on which the population data was valid, i.e., the census date.

Consider a request for all records for a given state in which the census date was after some predetermined date. A search table system might have two search tables, one for a date variable as described above and one for the state in which each city was located. The request in question would then be processed by finding all entries in the first search table which had a date after the predetermined date to obtain a first "result list" which is stored in a temporary memory buffer. The second search table would then be searched for all entries having the state variable equal to the state to produce a second result list which is stored in a second temporary memory buffer. The entries in the two result lists would then be compared against one another to find all entries that were present in both lists. If the results lists had L and M entries, respectively, this last comparison would require approximately L times M compare operations. If either L or M is large, the computational workload may actually exceed the workload needed to sequentially search the original database.

In addition to the above described problems, the relational databases itself tends to be inefficient as a mechanism for storing information. As noted above, the records must all contain the same fields. This leads to a significant amount of redundant information being stored. Consider the geographical database described above in which each record includes fields for state, county, and city. For each city in a given county, the field information for state must be repeated even though the combination of county and city uniquely defines the state.

The problem of this type of redundant information storage is addressed by a third prior art method of database system storing information which will be referred to as hierarchical databases, or tree-structure databases. A hierarchical database consists of a series of sets and subsets which store information. For storing geographical information in such a database, a country comprises a set of states. Each state includes a set of counties, and each county includes a set of cities.

The above example consist of four levels, or classes: country, states, counties, and cities. The example further comprises three relationships, or links: country to state, state to county, and county to city. The hierarchical database makes use of the observation that there is a natural progression from one level to the next level in the above relationships. The data relationships can be structured as a "tree" with the top, e.g., country in the above example, at the root node and the bottom level, e.g. city, at the "leaf" node level.

Due to the hierarchical or set-subset nature of the data in such a database, less space is required to store the information in a database. In progressing from the root node to the leaves, each successive level "inherits" the information of all levels above it. Hence, there is no need to repeat this information. The information is contained in the information which links the node in question to the node above it in the tree. The node from which a given node inherits is often referred to as its "parent".

In addition to providing more efficient storage for hierarchically ordered data, queries based on this database often may be answered without searching through all of the leaf nodes or keeping separate search tables. For example, all the cities contained within a state may be easily found by tracing from the entry in the state set for the state in question, through the county sets linked to that state, and then collecting all the cities linked to the counties found.

The advantages of the hierarchical database, however, are realized only when the information within the records of the database lends itself to a natural hierarchical ordering. Although some of the information in a typical database is hierarchical in nature, it is rarely found that all of the information may be organized into a single tree structure. If multiple trees are needed to represent the data, then complex queries must be processed in a manner analogous to that described above and the multiple result lists be combined. The combining of the results requires approximately the same computational workload as that obtained in search table ordered databases.

SUMMARY OF THE INVENTION

Broadly, the present invention encompasses a method and apparatus for storing and searching a large database of information with a minimum amount of time, a maximized domain of search queries, flexible information topologies and reduced amounts of required storage area.

More specifically, the present invention encompasses information storage and retrieval apparatus for storing and accessing information from a database comprising a plurality of records. Each record stores information which is divided into navigation fields and data fields. Each said navigation field comprises means for storing a value contained in a predetermined set of values associated with the navigation field. The information storage and retrieval apparatus of the present invention comprises means for generating a unique identifier for each record of the database and associating each said unique identifier to the information data of record in question. Additionally, the retrieval apparatus of the present invention comprises means for storing the navigational fields of the records as a topological map. The topological map comprises a plurality of nodes and links therebetween for representing the navigational fields. The nodes are organized into classes with each class representing one navigational field and including one node for each unique value realized by the navigational field over all the records in the database. Each link of the topology represents a relationship between two nodes. Finally, at least one of the nodes in the topological maps comprises one of said unique identifiers.

Broadly, it is an object of the present invention to provide an improved database and method for retrieving data therefrom.

It is a further object of the present invention to provide a database system which requires less storage space than the equivalent relational database.

It is yet another object of the present invention to provide a database system which is optimized for search on a plurality of search values without the need to generate and store search tables for each search value.

It is still further object of the present invention to provide a database system in which new records can be introduced without the need to reorder all of the existing database records.

These and other objects of the present invention will become apparent to those skilled in the art from the following detailed description of the present invention and the accompanying drawings.

DETAILED DESCRIPTION OF THE INVENTION

The features of the present invention may be better appreciated with a more detailed description of how a prior art relational database would be used in a simple business application. Consider a mail-order catalog business which sells goods throughout the country. The goods are distributed to its customers through a network of distribution points which includes a few regional distribution centers. Each regional distribution center, in turn, services a number of city distribution centers which, in turn, ship goods to the customer.

The orders delivered by this business could be stored in a conventional relational database. The database might have records consisting of the name and address of each customer who placed an order, a customer identification number used by the accounting department, the date the order was placed, and an order number which describes the goods ordered.

Figure 1A:
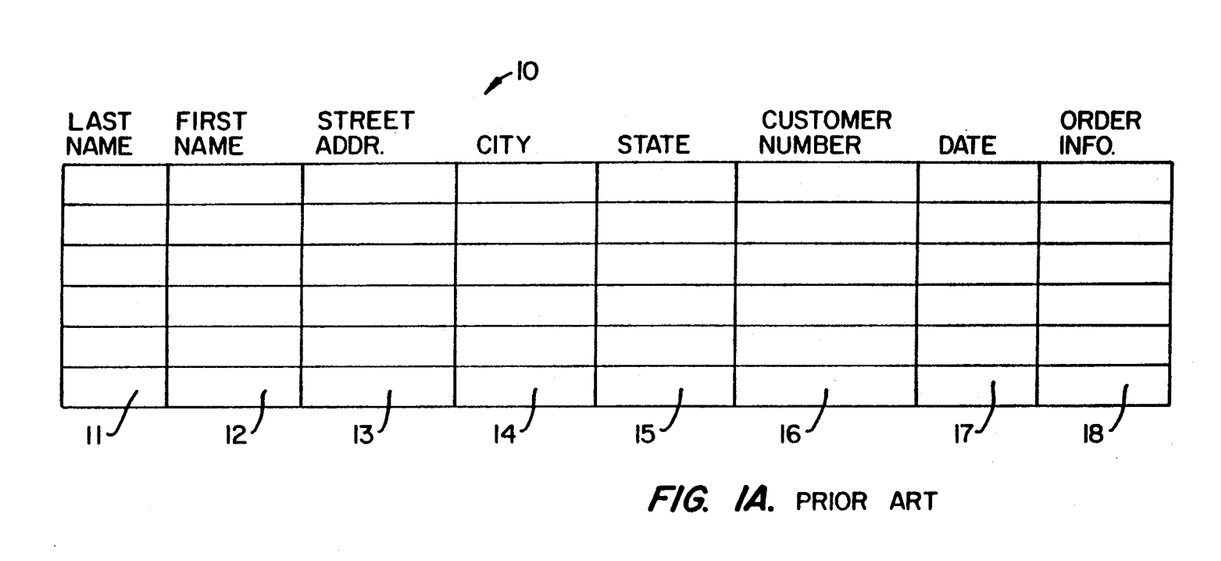
FIGS. 1(A) and 1(B) illustrate two exemplary relational tables for storing data according to the prior art.

An exemplary prior art relational database for storing the customer information is shown at 10 in FIG. 1(A). Database 10 includes 8 columns, 11-18, which are used to store the address and other data described above.

Figure 1B:
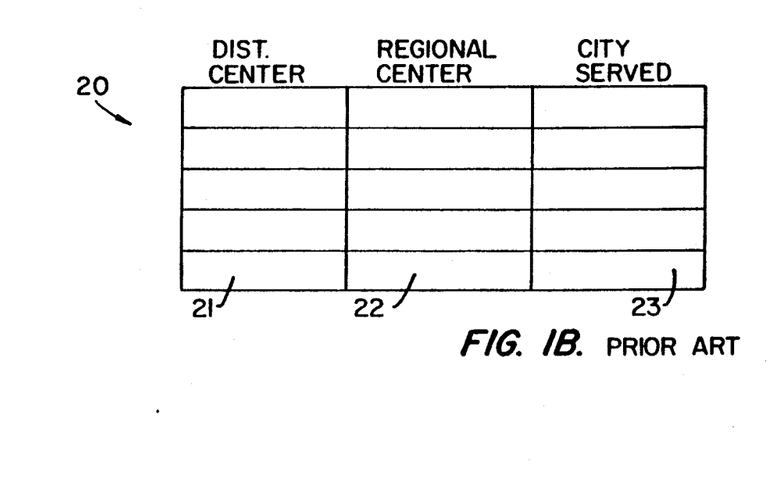

When an order is to be delivered, the sales person must reference the distribution route to find the closest distribution point which has the merchandise that has been ordered. The information on the distribution network could likewise be stored in a relational database in which each record corresponds to city distribution center. Each record would have, a field for the city center in question, the city it serves, and the regional distribution center servicing the city center in question. Such a database is shown in FIG. 1(B) at 20. Each row consists of three fields 21-23 for storing the described information.

These databases would be used by a sales person to enter an order in the database and arrange for the shipment of the merchandise from the nearest distribution center. If the customer knows his or her identification number, the sales person would take the order and then query the distribution network database for the city distribution center serving the customer's city. The records of that center would then be checked to determine if the merchandise was in stock. If it were not, the records of the regional center would be checked.

By providing search tables referencing customer name, the database can quickly find the previous order placed by the customer and provide the information on the customer's address from the previous order. If, however, the customer does not know his or her number, a search must be made by name. Hence, unless there is also a search table by name, the process can be quite time consuming. Furthermore, if the customer had a very common name, the resulting list of names might still be too long to read while the customer is on the telephone. Hence, a search table would be needed for ordering the database on the combination of city and name. For this type of search to be operative, the database must provide separate columns for street address, city, and state.

However, even if these search tables are maintained, the databases in question are still poorly organized for other queries. For example, suppose it is discovered that a particular regional center is overstocked with lawnmowers. The business decides to have a sale to clear the overstock. The sale is to be limited to the geographic area that would normally be serviced by the center. Hence, the business wishes to construct a list of all previous customers that live in a city which is serviced by a city distribution center that is, in turn, serviced by the regional center in question. To construct this list, the distribution system database must be queried to find all city distribution centers serviced by the regional center. A list of the cities served by these centers is then constructed. The customer order database must then be queried to find all previous customers who reside in one of the cities in the first list. Since the customer database is not organized for searches by city, the search must be done by searching each record in the customer database without the aid of a search table.

In addition to being poorly optimized for unanticipated searches, the customer database is likely to require a very large amount of storage space on the business' computers. Each customer record repeats the customer identification data such as name, and address. This redundant information can account for more than half of the storage space used by the database.

If all of the data in the customer database were hierarchical in nature, this redundancy could be reduced by restructuring the data as a tree. Although the data on address is hierarchical in nature, the data specifying the customer's name, order date, and order number is not.

Furthermore, the prior art does not provide a convenient method for combining the data in the distribution point database with that in the customer database. Prior art relational databases allow one to join two databases in which the records in each database have a common field. In the present example, the distribution database could be joined to the customer database by the field specifying the city. However, such database joining does not provide a significant improvement in the space needed to store the databases nor in the computational workload involved in selecting records based on information in both of the database.

Alternatively, the two database could be combined into a single table by adding two columns for storing the information specifying the distribution center and regional center to database table 10. It should be noted that database 20 which includes one record for each order placed in the present example would be expected to have many more records than database 10 which contains one record per city. Combining the two database would provide a single database that could be more efficiently searched; however, the duplication of the information from the smaller database 20 in the large customer database 10 would significantly increase the memory or disk space needed to store the database.

The present invention provides a database system which allows the information in the two database tables described above to be combined while providing more efficient storage of the information. The present invention is based on the observation that part of the data included in the databases is hierarchical in its organization and part is not. The information in distribution database 20 is hierarchical in nature, as is the address information contained in columns 13-15 of database 10. The remaining information is not of this type. As noted above, tree structured databases have a number of advantageous properties that can be realized if the information in the database has a hierarchical organization.

A database according to the present invention includes two types of data which are stored and searched in different manners. The first type of data will be referred to as navigational data and comprises the hierarchically organized data. The navigational data is stored in one or more tree structures. The remaining data will be referred to as informational data. The informational data is preferably stored in a relational type database.

Figure 2A:
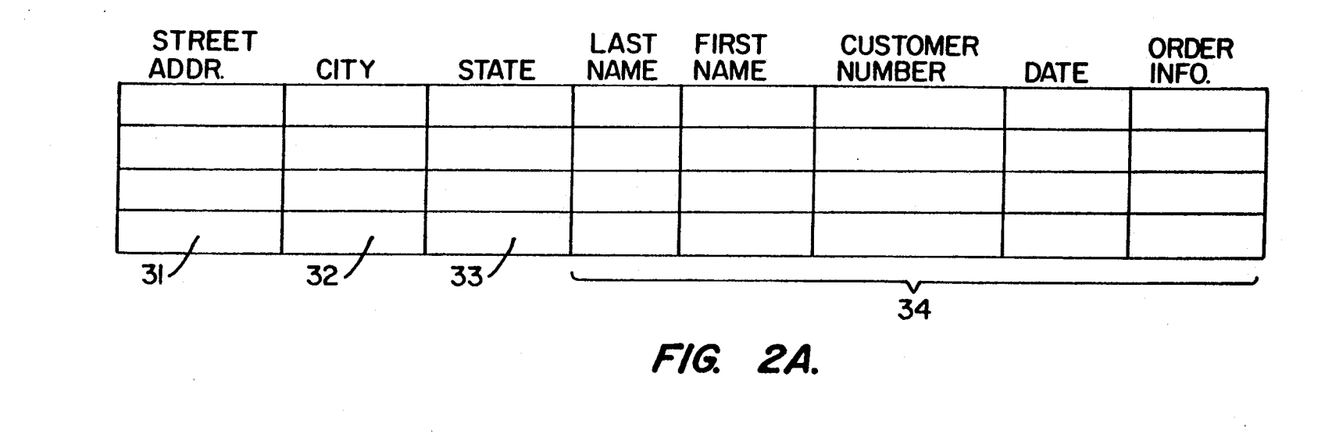
FIGS. 2(A), 2(B), and 2(C) illustrate the manner in which one of the tables shown in FIG. 1 can be converted into a database according to the present invention.

The manner in which a database according to the present invention may be derived from a conventional relational database may be more easily understood with reference to FIG. 2. FIG. 2 illustrates the conversion of database 10 into a database according to the present invention. To simplify the discussion, the columns of database 10 have been rearranged such that the hierarchical data is now located in columns 31-33 as shown in FIG. 2(A). The informational data columns are shown at 34.

Figure 2B:
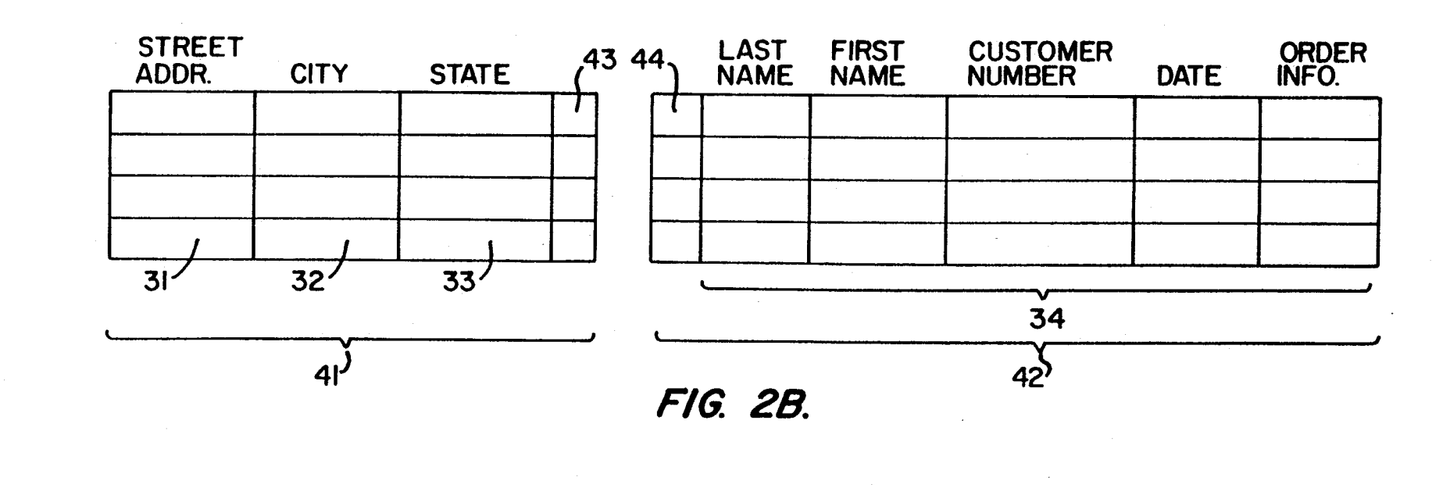

The database is then split into two tables 41 and 42 as shown in FIG. 2(B). Table 41 contains the navigational data and table 42 contains the informational data. An additional field is added to each record in each table. This field is shown in columns 43 and 44. A unique identifier is assigned to each record in the database. The value of this identifier is placed in these additional fields. Hence, column 43 is identical to column 44. This unique identifier provides a means for identifying the informational data record in table 42 that is associated with each record in navigational table 41.

Figure 2C:
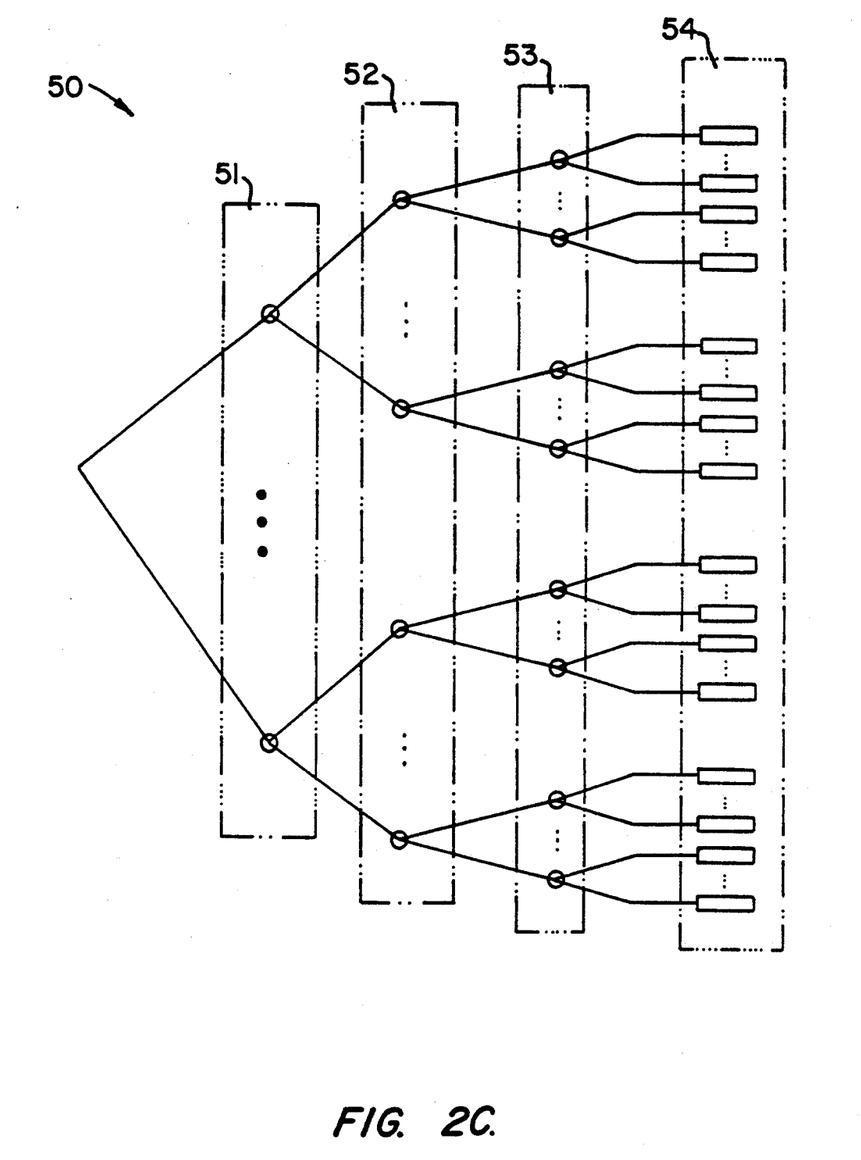

The final step of converting the database consists of replacing table 41 by a tree structure 50 as shown in FIG. 2(C). The nodes in tree structure 50 are divided into sets shown at 51-54. Each set of nodes corresponds to a column in table 41. The nodes in set 51 correspond to the state, those in set 52 correspond to the city, those in set 53 correspond to the street address, and those in set 54 correspond to the unique identifier defined for each record in the original database. Each node in a given set is linked to a node in a set one level higher up in the hierarchy. Hence, there is no need to repeat the redundant data. For example, by traversing the tree from any given city node to the state node to which it is linked, one may ascertain the state in which the city is located.

Tree structure 50 may be used to select all informational data records corresponding to a particular query stated in terms of the navigational data. For example, to find all records in which the customer was located in a given city, tree structure 50 is accessed at the city level and the node corresponding to the city in question found. The node is then traced via its links to the unique identifier at level 54. The unique identifiers are then used to access the informational data in table 42.

The above discussion assumed that only one set of hierarchical data was present in the database. However, it will be apparent to those skilled in the art that databases having several sets of hierarchical data are possible. One method according to the present invention for searching a database having two sets of hierarchical data would be to construct a separate tree structure for each set. When presented with a query requiring data from both tree structures, one would then make intermediate lists in a manner analogous to that described above with prior art relational databases. The unique identifiers corresponding to the data records satisfying the portion of each query that could be ascertained from each tree structure would be stored in temporary lists. The temporary lists would then be examined entry by entry to determine which entries satisfied the entire query.

Although such a scheme would work satisfactorily, it suffers from the same problem associated with the use of this technique when applied to conventional relational data bases. If two lists having L and M entries, respectively, are to be combined, a computational workload of the order of L times M operations is needed. In addition, the storage needed to store this second tree must include enough space to accommodate the complete list of unique identifiers at its leaf nodes. This often results in more storage than absolutely necessary. As pointed out above, it would be advantageous to provide a system which avoids this workload and is more efficient in storage space usage. The preferred embodiment of the present invention provides such a method if the tree structures in question have at least one set of nodes in common.

Figure 3A:
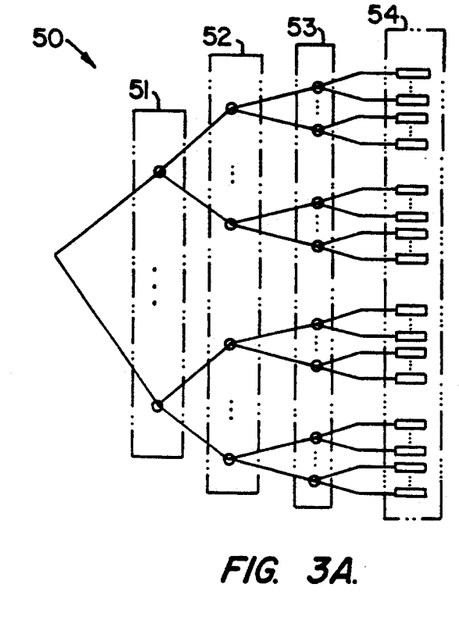
FIGS. 3(A), 3(B), and 3(C) illustrate the manner in which two tree structures can be combined to form a topological map according to the present invention.
Figure 3B:
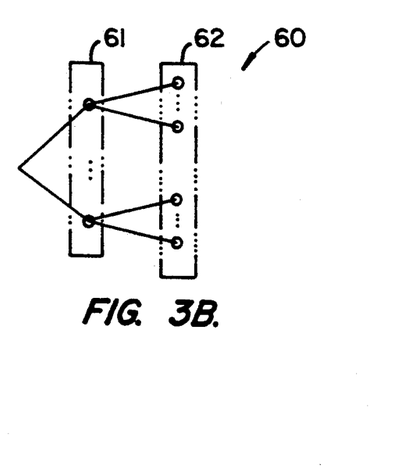

The manner in which the preferred embodiment of the present invention provides these advantages may be more easily understood by illustrating the manner in which the hierarchical data in the distribution database may be merged with the data in tree structure 50 shown in FIG. 3(A) to provide a topological map containing both sets of hierarchical data. The tree structure corresponding to the distribution database is shown at 60 in FIG. 3(B). Tree structure 60 has two sets of nodes 61 and 62. Set 61 corresponds to the regional distribution centers, each node corresponding to one such center. Set 62 corresponds to the cities served by the various regional centers, each node corresponding to one such city. For convenience, tree structure 50 has been reproduced in FIG. 3.

Tree structures 50 and 60 have a set of nodes in common, namely the nodes in set 52 in tree structure 50 and the nodes in set 62 in tree structure 60. The two tree structures are merged by linking each regional distribution node in set 61 to the city node in set 52 corresponding to the city said node is linked to in set 62. The nodes in set 62 are then eliminated to produce the topological map shown at 70 in FIG. 3(C). It should be noted that the additional storage needed for the topological map is less than that need to store the two tree structures separately. Hence, the preferred embodiment of the present invention provides a substantial reduction in storage over the embodiment utilizing separate tree structures.

Figure 3C:
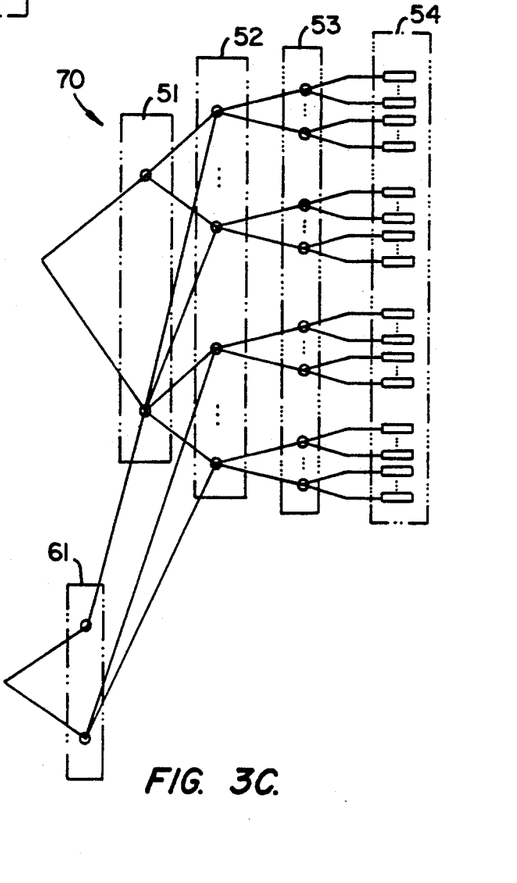

Topological map 70 may be used to answer queries based on information in both tree structure 50 and 60 without the need of combining two lists consisting of the leaf nodes in each tree structure. Suppose one wished to know all customers in a given state that receive merchandise from a given regional distribution center. This query can be answered by starting at the city nodes in set 52. For each city node, the links to the set of state nodes are first examined. If a given city is linked to the state in question, the second link to the distribution center set 61 is examined. If the link in question is the desired distribution center, then all records having unique identifiers coupled to the city node in question are returned. This search requires a computational workload which is proportional to the number of unique cities in the database.

Having described the topological structure of a database according to the present invention, the manner in which the information specifying the topological map is stored will now be explained. The information storage and retrieval apparatus of the present invention comprises a plurality of frame structures for storing navigation information. An exemplary frame structure is shown at 100 in FIG. 4. Each frame structure stores the information which defines one set of nodes. For example, each column in table 41 described above would have a corresponding frame structure. Frame structure 100 comprises a class identifier 110 for indicating the class which is represented by frame structure 100. In the case of table 41, the class identifier specifies the title of the corresponding column.

Figure 4:
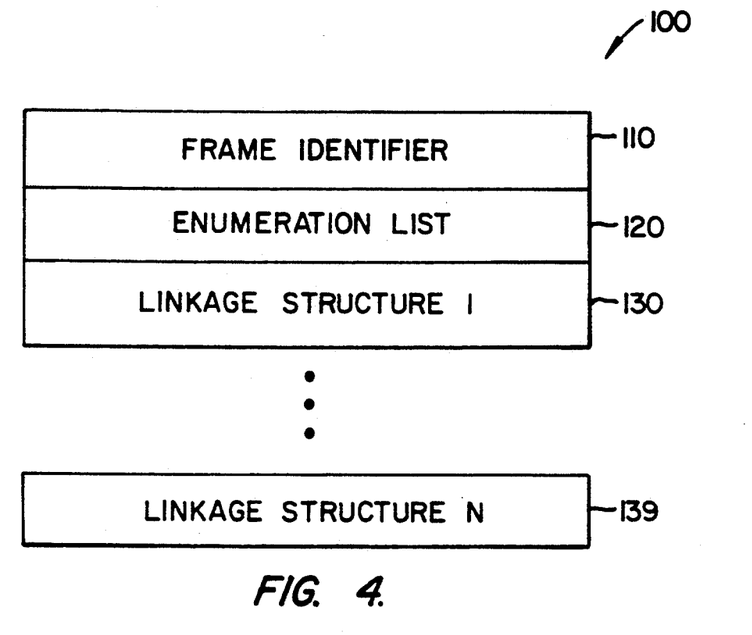
FIG. 4 is a block diagram of a frame used to store a topological map according to the present invention.

Frame structure 100 further comprises an enumeration list 120 for storing the names of all instances, or nodes within the specified class. Enumeration list 120 comprises a list of the possible values for the corresponding item in a query. For example, in the frame for "city" in a topological structure derived from table 41, the enumeration list would include the name of each city appearing in table 41. Each city appears only once in Frame structure 100, even if there are multiple appearances in table 41. A query seeking database records in which the city was Fresno would result in the enumeration list in the city frame being tested for the presence of the word "Fresno" or some symbol representing this word. Since each name appears only once, the redundant information which increases the size of relational databases is substantially reduced in the present invention.

Additionally, frame structure 100 comprises a plurality of linkage structures of which structures 130 and 139 are examples. Each linkage structure stores the links between the nodes of the class represented by the frame and nodes of an adjacent class to which these nodes are connected. In principle, there are two possible directions in the topological map for such linkages, the direction toward the leaf nodes containing the unique identifiers and the direction away from each node. In the preferred embodiment of the present invention, the linkages to the parent nodes, i.e., the adjacent nodes furthest from the leaf nodes, are stored. However, structures utilizing the other convention will be apparent to those skilled in the art.

Figure 5:
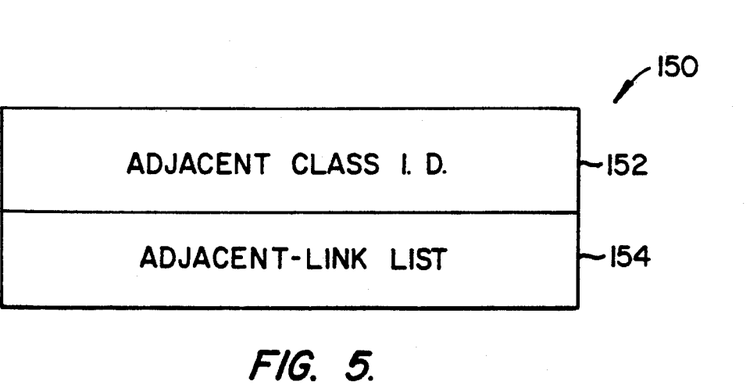
FIG. 5 is a block diagram of a linkage structure of the type shown in FIG. 4.

The preferred embodiment of the linkage structure according to the present invention is shown at 150 in FIG. 5. Linkage structure 150 comprises an identifier 152 and adjacent-link list. Identifier 152 identifies the adjacent class which has links to the frame structure 100 in question. Adjacent-link list 154 specifies the links between individual nodes of the set represented by frame structure 100 and individual nodes of the adjacent class. In the preferred embodiment of the present invention, comprising a list of pointers, each pointer identifies the entry in the enumeration list of the adjacent frame structure to which a node in the present frame is linked.

Figure 6A:
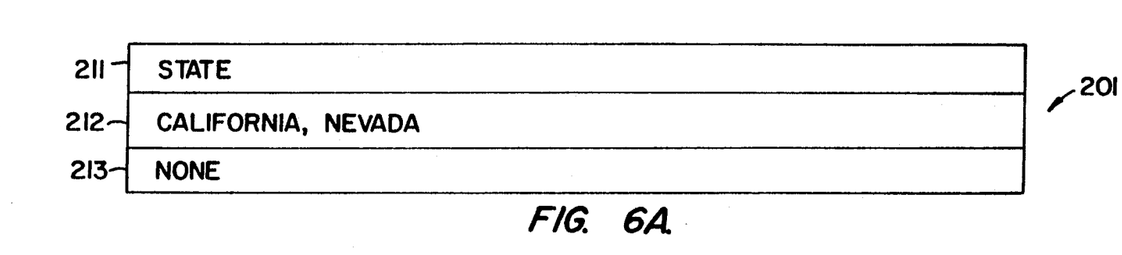
FIGS. 6(A), 6(B), and 6(C) illustrate the exemplary frames for the topological map shown in FIG. 3.
Figure 6B:
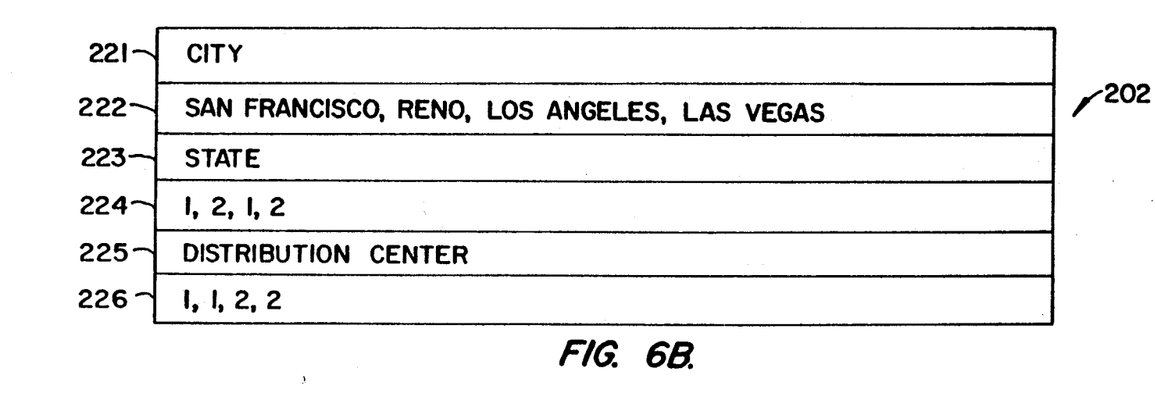

The adjacent-link lists may be more easily understood with reference to a specific example. Refer now to FIG. 6 which shows three exemplary frames corresponding to the exemplary case discussed with reference to FIG. 3. The first frame 201 shown in FIG. 6(A) corresponds to the nodes representing the set of states 51 in topological structure 70 shown in FIG. 3. The second frame 202 shown in FIG. 6(B) corresponds to the nodes in the set of cities 52. The third frame 203 corresponds to the regional distribution center nodes in set 61. For simplicity it will be assumed that only the cities of Los Angeles, San Francisco, Reno, and Las Vegas are present in the database. In addition, it will be assumed that there are two regional distribution centers, a northern center serving San Francisco and Reno and a southern center serving Los Angeles and Las Vegas.

Frame 201 comprises an identifier 211 indicating that the frame refers to "State". The state names which currently exist in the database are indicated at 212, namely California and Nevada. Since frame 201 has no "parent" frame, the space 213 normally allocated for the linkage structures merely contains a marker indicating that frame 201 is not linked to any frame in the direction away from the leaf nodes of the structure.

Frame 202 comprises an identifier 221 indicating that the frame refers to "City". The city names which currently exist in the database are indicated at 222. The four cities indicated above are currently identified in the enumeration list 222. The nodes in the city frame 202 have two possible parents, i.e., state and regional distribution center. The linkage list for the state linkages is shown at 223 and 224. The entry at 223 identifies the parent set state. The linkage list at 224 identifies which entry in the state enumeration 212 list is linked to each entry in city enumeration list 221. For example, San Francisco is linked to California, the first entry in the state enumeration list 212. Hence, the entry "1" appears as the first entry of linkage list 224. Similarly, Reno is linked to Nevada which is the second entry in state enumeration list 212; the entry "2" appears as the second in linkage list 224. In general, if the $i^{th}$ entry in the city enumeration list is linked to $k^{th}$ entry in the state enumeration list, the $i^{th}$ entry in the state linkage list will be the value k.

Figure 6C:
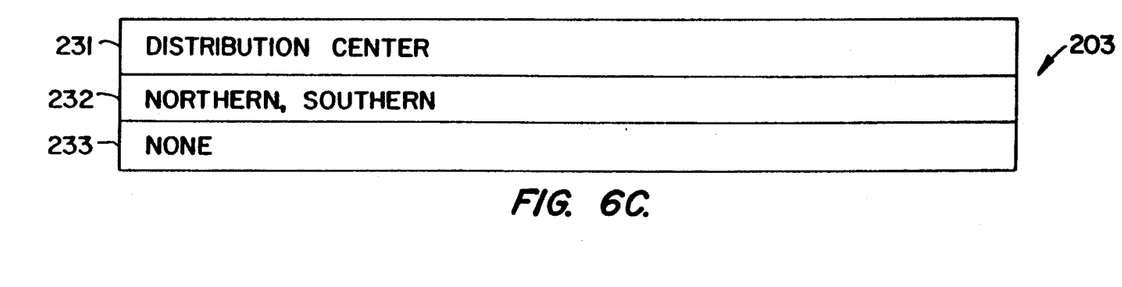

The nodes represented by frame 202 are also linked to the nodes represented by frame 203 which refers to the Distribution Center as noted in the frame identification 231. The enumeration list for frame 203 consists of the two possible values "Northern" and "Southern". Frame 203 is also at the top of the hierarchy; hence it has no linkages of its own as indicated at 233.

The linkages between the city frame 202 and the distribution center frame 203 shown in FIG. 6(C) are stored in the second linkage list in frame 202. This list has an identifier "Distribution Center" at 225 and a linkage list 226 indicating which entry in of the enumeration list 232 of frame 203 is linked to each of the entries in the enumeration list 222 of frame 202.

In the preferred embodiment of the present invention, a list is kept of all of the frames and their storage locations. When a query is presented, the lowest level frame referenced by the query is entered. Here, lowest level means the level closest to the frame which includes the unique identifiers discussed above. The entries in the enumeration list of this lowest level frame which satisfy the query are then determined by tracing the linkages to higher level frames and performing the necessary calculations to determine if the instance in the lowest level frame being tested satisfies the query. If it does, all of the database records having unique identifiers which are linked to the node corresponding to the instance in question are returned. The next instance in the frame is then tested and the process repeated. Since the testing is typically done at a class or set level which is above the level in which the unique identifiers are stored, considerable savings in computational workload are realized, since one test can eliminate a large number of database records from consideration.

When a node having two or more parents is encountered, two or more parental search paths must be conducted in parallel. This leads to a combinatorial increase in parallel search paths if each parent node encountered has multiple parents. As long as there are a finite number of classes and there are no recursive loops between adjacent classes, the number of possible parallel search paths is limited to a finite value. Additionally, efficient methods for examining such multiple paths, such as recursive-descent methods, are well known in the computer science art. With respect to complex queries having two or more match conditions, no additional search time is required since the parental lineage is examined once for all match conditions.

It will be clear from the preceding discussion that the navigational data must be based on fields in the database records whose contents can attain only an enumerable number of values. If this were not the case, then each frame would require infinite storage.

In addition to providing a more efficient system for storing databases containing hierarchical data, the present invention is also more easily updated then conventional databases having a plurality of search tables. In a conventional database, when a new record is added to the database, it must also be added to each search table. All of the search tables must then be reordered.

In the present invention, when a new record is added, the record is first split into its navigational data and informational data. The next unique identifier is assigned to the record and the informational data stored in a relational database together with the unique identifier. The frames in which the navigational data are stored only need be altered to the extent that the new record presents a new occurrence of the variable stored in each frame. The lowest level frame which includes the unique identifiers must always be altered by entering the unique identifier in the enumeration list thereof and placing an entry in the linkage list(s) indicating which entries in the parent frames linked to the lowest level are linked to the new entry. If the new entry presents a new instance of a variable in a higher frame, then that frame must similarly be updated. However, those frames which already contain the identifier need not be altered.

While the addition of new informational data always requires at least an addition to the lowest level frame, the addition of new navigational data may often be accomplished without changing the informational database. For example, if a new tree structure is merged into the topological map as described above with reference to FIG. 3 above, changes to the informational data are not required.

The updating process can be more easily understood with reference to the topological structure shown in FIG. 3 and the exemplary system on which it is based. Suppose that an order is placed by an existing customer, i.e., one that had placed a prior order. The navigational data for the database record corresponding to this order consists of the customer's address and the unique identifier assigned to the database record. Since the customer's address is already in the street address frame 53 shown in FIG. 3, the only new entry is one to frame 54 which stores the unique identifiers. The new identifier is merely linked to the existing node in frame 53 corresponding to the customer's street address.

Now consider the case in which new customer places an order, and the customer in question lives in a city that appears in the city frame. In this case frame 54 must be updated to show the unique identifier, and frame 53 must be updated to show the new street address to which the new unique identifier is linked. Since the city in question is already stored in the enumeration list of frame 52, no changes need be made to this frame.

The present invention is preferably implemented on a general purpose digital computer; however, it will be apparent to those skilled in the art that special purpose hardware may also be used.

The present invention has been described with reference to a relational database for storing the informational data in each database record. However, it will be apparent to those skilled in the art that any storage means in which the informational data record can be stored and retrieved by giving its unique identifier may be used. A relational database is preferred because such systems are optimized for storing non-hierarchical data. In addition, the present invention may utilize an existing relational database to store the informational data. In this case, the unique identifier corresponds to a conventional foreign key list in the relational database.

There has been described herein a novel database system. Various modifications to the present invention will become apparent to those skilled in the art from the foregoing description and accompanying drawings. Accordingly, the present invention is to be limited solely by the scope of the following claims.

What is claimed is:

1. A method for converting organized data from a data record structure into a hybrid structure which allows for efficient storage and retrieval of the organized data by a digital computer, where the data record structure includes a plurality of records each divided into a plurality of fields, where each field of the plurality of fields stores data of a field type associated with the field and where the organized data in the data record structure is encompassed in the plurality of fields of the plurality of records, the method comprising the steps of:

separating the plurality of fields into navigational fields and informational fields, where geographic values encompassed in each navigational field of the data records are of a geographical class defined by the field type of said navigational field, wherein said separating step further comprises the steps of assigning to each said record of the plurality of fields a unique identifier, and adding a unique identifier field to the navigational fields and to the informational fields where each said record of said unique identifier field encompasses the unique identifier assigned to that record;

ordering said navigational fields into a plurality of distinct hierarchical data structures each comprising a plurality of node classes and links therebetween, where each said node class corresponds to a specific geographical class and each node in said node class corresponds to a distinct geographic value of said geographical class, where a node class lower in said hierarchical data structure represents a geographical class that is hierarchically subordinate to and wholly encompassed in the geographical classes represented by node classes higher in said hierarchical data structure, and where said links between said node classes indicate which geographic values listed in a lower node class are geographically encompassed in a geographic value listed in a higher node class immediately adjacent to and above said lower node class in said hierarchical data structure;

identifying among the plurality of distinct hierarchical data structures one of said distinct hierarchical data structures having at least one geographical class in common, where a distinct hierarchical data structure is one which is hierarchically independent from all other hierarchical data structures and which has at least one geographic class that is unique to that hierarchical data structure;

merging portions of said distinct hierarchical data structures having one or more geographic classes in common by linking said structures to a single node class for each said geographical class said structures have in command; and creating for each said node class in the merged hierarchical data structure a table comprising an identifier describing the geographical class represented by the node class, an enumeration list encompassing the geographical values of said node class, and a plurality of linkage structures, where each linkage structure comprises an adjacent class identifier describing a geographical class immediately adjacent to and above said node class in said merged hierarchical data structure, and an adjacent link list, specifying for each first geographic value in said enumeration list, a second geographic value in an adjacent node class in which said first geographic value is geographically encompassed, and wherein the navigational field of a lowest geographical class includes said unique identifier thereby pointing to a corresponding one of said informational fields containing said same unique identifier.

2. The method of claim 1, wherein said step of ordering the navigational fields into a plurality of hierarchical data structures further comprises the steps of:

creating a lowest node class for each hierarchical data structure, where said lowest node class encompasses nodes representing the unique identifiers; and linking said lowest node class to the node class lowest in the hierarchical data structure which encompasses geographic values to indicate a relationship between said geographic values and the records of said informational fields.

3. A method for converting organized data from a data record structure into a hybrid structure which allows for efficient storage and retrieval of the organized data by a digital computer, where the data record structure includes a plurality of records each divided into a plurality of fields, where each field of the plurality of fields stores data of a field type associated with the field and where the organized data in the data record structure is encompassed in the plurality of fields of the plurality of records, the method comprising the steps of:

separating the plurality of fields into navigational fields and informational fields, where values encompassed in each navigational field of the data records are of a class defined by the field type of said navigational field, wherein said separating step further comprises the steps of assigning to each said record of the plurality of fields a unique identifier, and adding a unique identifier field to the navigational fields and to the informational fields of a data record, where said unique identifier field encompasses the unique identifier assigned to that data record;

ordering said navigational fields into a plurality of distinct hierarchical data structures each comprising a plurality of node classes and links therebetween, where each said node class corresponds to a specific class of values and each node in said node class corresponds to a distinct value of said class, where a node class lower in said hierarchical data structure represents a class that is hierarchically subordinate to and wholly encompassed in the classes represented by node classes higher in said hierarchical data structure, and where said links between said node classes indicate which values listed in a lower node class are specifically related to a value listed in a higher node class immediately adjacent to and above said lower node class in said hierarchical data structure;

identifying among the plurality of distinct hierarchical data structures ones of said distinct hierarchical data structures having at least one class in common, where a distinct hierarchical data structure is one which is hierarchically independent from all other hierarchical data structures and which has at least one class that is unique to that hierarchical data structure;

merging portions of said distinct hierarchical data structures having one or more classes in common by linking said structures to a single node class for each class said structures have in common, where each said node in the merged node class represents the unique occurrence of a value encompassed in the common, yet unmerged node classes; and creating for each said node class in the merged hierarchical data structure a table comprising an identifier describing the class represented by the node class, an enumeration list encompassing the values of said node class, and a plurality of linkage structures, where each linkage structure comprises an adjacent class identifier describing a class immediately adjacent to and above said node class in said merged hierarchical data structure, and an adjacent link list, specifying for each first value in said enumeration link, a second value in an adjacent node class to which said first value is related, and wherein the navigational field of a lowest class includes said unique identifier thereby pointing to a corresponding one of said informational fields containing said same unique identifier.

4. The method of claim 3, wherein said step of ordering the navigational fields into a plurality of hierarchical data structures further comprises the steps of:

creating a lowest node class for each hierarchical data structure, where said lowest node class encompasses nodes representing the unique identifiers; and linking said lowest node class to the node class lowest in the hierarchical data structure which encompasses a class of specific values to indicate a relationship between said specific values and the records of said informational fields.

* * * * *

UNITED STATES PATENT AND TRADEMARK OFFICE
CERTIFICATE OF CORRECTION

PATENT NO. : 5,295,261
DATED : March 15, 1994
INVENTOR(S) : Charles T. Simonetti It is certified that error appears in the above-identified patent and that said Letters Patent is hereby corrected as shown below:

Title page, after [54], "HIERARCHIAL" should read --HIERARCHICAL--.

Column 1, line 4, "HIERARCHIAL" should read --HIERARCHICAL--.

Column 13, line 46, "one" should read --ones--; line 57, "command" should read --common--.

Column 15, line 16, "link, a" should read --list, the--.

Signed and Sealed this

Fourth Day of October, 1994

*Attest:*

BRUCE LEHMAN

*Attesting Officer*  *Commissioner of Patents and Trademarks*